(12) United States Patent
Liu et al.

(10) Patent No.: US 11,529,609 B2
(45) Date of Patent: Dec. 20, 2022

(54) PREPARATION METHOD AND APPLICATION FOR A RESIN-BASED IRON OXIDE-CONTAINING COMPOSITE PHOSPHATE REMOVAL ADSORBENT

(71) Applicant: HUAZHONG AGRICULTURAL UNIVERSITY, Wuhan (CN)

(72) Inventors: Guanglong Liu, Wuhan (CN); Xuguang Li, Wuhan (CN); Haijian Bing, Wuhan (CN); Changquan Wang, Wuhan (CN); Zhenghua Zhe, Wuhan (CN); Tao Li, Wuhan (CN); Renkai Yan, Wuhan (CN); Jianwei Zhao, Wuhan (CN); Yumei Hua, Wuhan (CN); Dionysios (Dion) D. Dionysiou, Wuhan (CN); Mallikarjuna N. Nadagouda, Wuhan (CN); Bangxing Ren, Wuhan (CN); Wael Abdelraheem, Wuhan (CN)

(73) Assignee: HUAZHONG AGRICULTURAL UNIVERSITY, Wuhan (CN)

( * ) Notice: Subject to any disclaimer, the term of this patent is extended or adjusted under 35 U.S.C. 154(b) by 311 days.

(21) Appl. No.: 17/007,198

(22) Filed: Aug. 31, 2020

(65) Prior Publication Data
US 2021/0154643 A1 May 27, 2021

(30) Foreign Application Priority Data
Nov. 25, 2019 (CN) .......................... 201911162590.7

(51) Int. Cl.
*B01J 20/06* (2006.01)
*B01J 20/26* (2006.01)
(Continued)

(52) U.S. Cl.
CPC ............ *B01J 20/265* (2013.01); *B01J 20/06* (2013.01); *B01J 20/285* (2013.01);
(Continued)

(58) Field of Classification Search
CPC ........ B01J 20/265; B01J 20/06; B01J 20/285; B01J 20/3085; B01J 20/26; C02F 1/288
See application file for complete search history.

(56) References Cited

U.S. PATENT DOCUMENTS 3,923,665 A * 12/1975 Lambert .................. B01J 41/05
424/78.26
4,276,177 A * 6/1981 Smith .................. B01D 61/145
210/683
(Continued)

FOREIGN PATENT DOCUMENTS

CN 1772370 A 5/2006

OTHER PUBLICATIONS

Bingjun Pan et al., "Development of polymer-based nanosized hydrated ferric oxides (HFOs) for enhanced phosphate removal from waste effluents", Water Research 43 (2009), pp. 4421-4429.

*Primary Examiner* — Chester T Barry
(74) *Attorney, Agent, or Firm* — WPAT, PC

(57) ABSTRACT

A preparation method of a resin-based iron oxide-containing composite phosphate removal adsorbent is provided. An alkaline anion resin is taken as a base, a potassium ferrate is used as an iron source, and a characteristics of ferrate ions easily adsorbed on a surface of the anion resin are utilized to prepare resin-based iron oxide-containing composite phosphate removal adsorbent by one-step in-situ hydrolysis precipitation, compared with the related art, a preparation process of the disclosure is relatively simpler, a time period is shorter, and a production cost is lower. It has a strong ability to eliminate interference from other anions in the waste effluents, and it has a strong adsorption capacity, fast (Continued)

adsorption speed and large adsorption capacity for the phosphate. Moreover, it has the advantages of strong regeneration ability and multiple repeated use times.

2 Claims, 1 Drawing Sheet

(51) Int. Cl.
    *B01J 20/285*     (2006.01)
    *B01J 20/30*     (2006.01)
    *C02F 1/28*     (2006.01)
    *C02F 101/10*     (2006.01)
    *C02F 103/00*     (2006.01)

(52) U.S. Cl.
    CPC ........... *B01J 20/3085* (2013.01); *C02F 1/288* (2013.01); *C02F 1/281* (2013.01); *C02F 1/285* (2013.01); *C02F 2101/105* (2013.01); *C02F 2103/007* (2013.01); *C02F 2303/16* (2013.01)

(56) References Cited

U.S. PATENT DOCUMENTS

| | | | |
|---|---|---|---|
| 4,724,262 A * | 2/1988 | Shimbo | C07F 9/025 549/222 |
| 7,291,578 B2 * | 11/2007 | SenGupta | C02F 1/42 210/683 |
| 2011/0268672 A1 * | 11/2011 | Monzyk | A23L 33/16 510/276 |
| 2020/0002193 A1 * | 1/2020 | Viswanathan | C02F 1/288 |

* cited by examiner

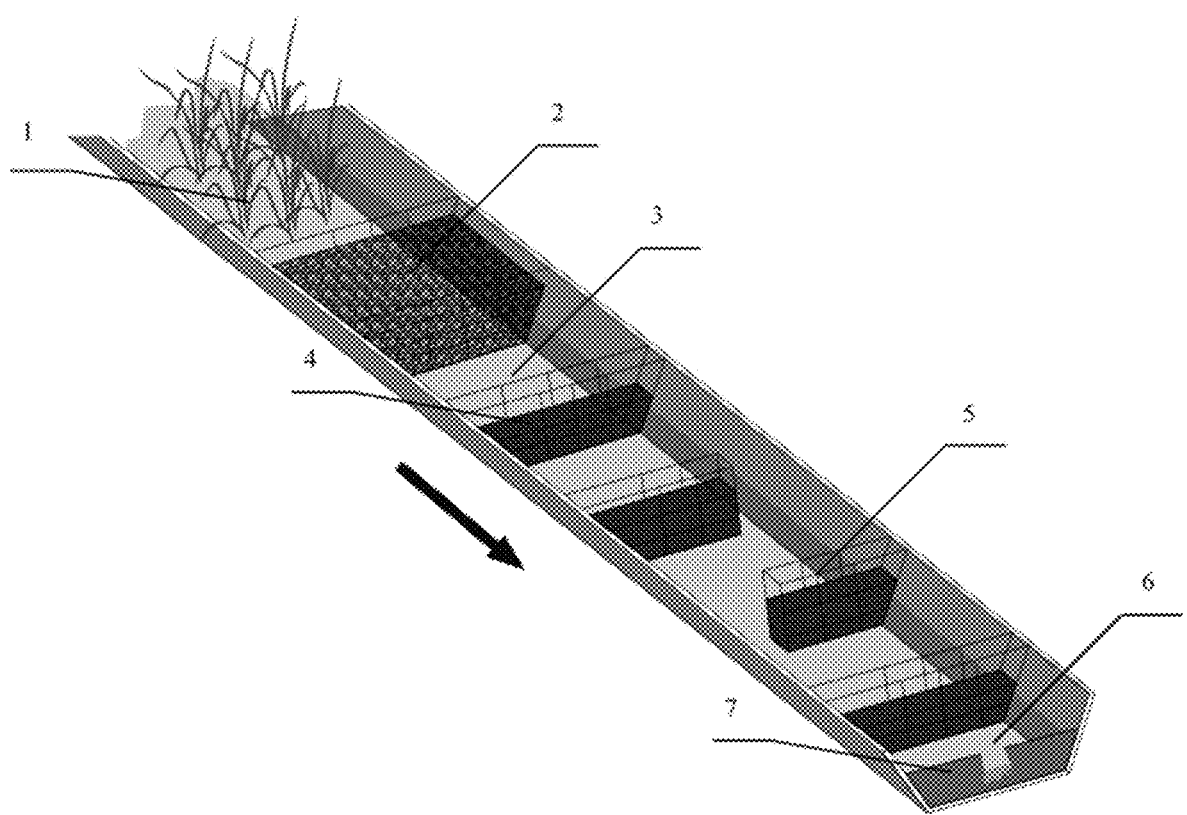

PREPARATION METHOD AND APPLICATION FOR A RESIN-BASED IRON OXIDE-CONTAINING COMPOSITE PHOSPHATE REMOVAL ADSORBENT

FIELD OF THE DISCLOSURE

The disclosure relates to a field of environmental treatment, and more particularly to a preparation method of a resin-based iron oxide-containing composite phosphate removal adsorbent, and the disclosure also relates to an application of a resin-based iron oxide-containing composite phosphate removal adsorbent and a method of treating phosphate-containing waste effluents.

BACKGROUND

Water eutrophication causes algae and other plankton to proliferate rapidly, the dissolved oxygen content in water is decreased and the water quality is deteriorated, which has become one of important problems that endangering human health and threatening the safety of drinking water. Excessive phosphate input is an important factor leading to water eutrophication. Therefore, the development of effective phosphate removal adsorbent is an important means to reduce phosphate input in rivers and lakes.

The existing phosphate removal methods include chemical precipitation method, biological method, membrane separation method, adsorption method, etc., but the single method is often difficult to apply to the treatment of many different types of phosphate-containing waste effluents. Therefore, the combination of multiple methods has become a preference. For example, in the treatment of phosphate in farmland non-point source pollution waste effluents, chemical precipitation method and membrane separation method are not suitable due to the large amount of waste effluents and low concentration of phosphate. The ecological interception ditch in biological method is one of the effective methods to reduce the phosphate in farmland non-point source pollution waste effluents. However, the ecological interception ditch often needs to face the seasonal problem. The combination of adsorption method and biological method can effectively solve this problem.

The core of constructing a new ecological interception ditch is the screening of adsorbents. Traditional adsorbents mainly include activated carbon, modified biochar, red mud, zeolite, diatomite, iron oxide, etc. Although these adsorbents have certain adsorption capacity for phosphate in waste effluents, there are some problems in stability, adsorption capacity, selectivity and practicability. Based on the idea of phosphate removal and recycling, anion resin is considered to be an ideal phosphate removal material. Some scholars have modified the surface of anionic resin to reduce the selective defects. Iron (hydrogen) oxide is considered as an ideal resin modified material because of its environmental friendliness, stable chemical properties and strong affinity for phosphate adsorption. For example, Pan Bingcai's team successively has reported in a Chinese Patent Application Publication No. CN 1772370A and an article titled "Development of polymer-based nanosized hydrated ferric oxides (HFOs) for enhanced phosphate removal from waste effluents" about researches of removals of arsenate and phosphate by supporting iron hydroxy oxide on anionic resin.

The core of these methods is to load positive $Fe^{3+}$ in the form of $FeCl^{4-}$ onto the anionic resin, which leads to a complex process and greatly increases the cost of a resin-based iron-containing composite phosphate removal adsorbent. Therefore, it is still an urgent need to develop adsorbents with low production cost, economic applicability and stable phosphate removal efficiency. A potassium ferrate is a water treatment agent that integrates multiple functions such as oxidation, disinfection, flocculation and coagulation. Its reduction product can form a larger network structure and higher positive charge than aluminum salt and iron salt hydrolysis products. The hydrolyzed product is safe and non-toxic, and the solution is relatively stable under low concentration and alkaline conditions. Taking advantage of features that ferrate ions are easily adsorbed on the anionic resin, a resin-based iron-containing composite phosphate removal adsorbent is prepared by one-step in-situ hydrolysis to develop a more economical iron-containing composite resin.

SUMMARY

An objective of the disclosure is to provide a composite phosphate removal material with large adsorption capacity, strong stability, high reuse rate, good selectivity and easy preparation.

Technical solutions of the disclosure are embodied as follows:

a preparation method of a resin-based iron oxide-containing composite phosphate removal adsorbent, includes:

step(i) adding an alkaline anion resin into a prepared alkaline potassium ferrate solution, and stirring for 1-5 hours at a room temperature to make ferrate ions exchange with anions of the alkaline anion resin;

step(ii) discarding a supernatant in a solution obtained in the step (i), adding a water, heating to 50° C.-70° C. and stirring again for 1-3 hours to make the ferrate ions exchanged onto the alkaline anion resin hydrolyze into a ferric hydroxide;

step(iii) adding a 2-10% by mass sodium chloride solution to a solution obtained in the step (ii) to transform a hydroxyl group bonded onto the alkaline anion resin into $Cl^-$ to thereby obtain a composite resin loaded with nano-sized hydrated iron oxides; and step(iv) washing the composite resin loaded with nano-sized hydrated iron oxides to be neutral and then drying to obtain the resin-based iron oxide-containing composite phosphate removal adsorbent.

According to an embodiment of the disclosure, the alkaline anion resin is an alkaline anion exchange resin with a product model of D-201, 201*7, 201*4, IRA-900, or IRA-402. Moreover, such alkaline anion exchange resin generally is a strongly basic anion exchange resin.

According to an embodiment of the disclosure, the alkaline potassium ferrate solution has a concentration of 0.03-0.2 mol/L.

According to an embodiment of the disclosure, the alkaline potassium ferrate solution has a PH of 9-12 mol/L.

According to an embodiment of the disclosure, an amount of adding the alkaline anion resin is 20-200 g/L.

According to an embodiment of the disclosure, the resin-based iron oxide-containing composite phosphate removal adsorbent is used/applied for a pollution treatment of phosphate-containing waste effluents.

According to another aspect of the disclosure, a method of treating phosphate-containing waste effluents as provided includes following steps:

packing the resin-based iron oxide-containing composite phosphate removal adsorbent obtained by the above preparation method into a column, and introducing phosphate-containing waste effluents into the column for elution at a temperature of 20-40° C. and a flow rate of 10-30 BV/h; and adding a mixed solution of 2-5% NaCl and 2-5% NaOH for restoring the alkaline anion resin, after the elution is completed.

Reaction formulas involved in the disclosure are as follows:

(1) The ferrate ions exchange with the anions of the alkaline anion resin:

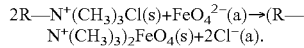
$$2R\text{—}N^+(CH_3)_3Cl(s)+FeO_4{}^{2-}(a)\rightarrow(R\text{—}N^+(CH_3)_3)_2FeO_4(s)+2Cl^-(a).$$

(2) The ferrate ions exchanged onto the alkaline anion resin hydrolyze into the ferric hydroxide:

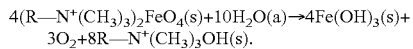
$$4(R\text{—}N^+(CH_3)_3)_2FeO_4(s)+10H_2O(a)\rightarrow 4Fe(OH)_3(s)+3O_2+8R\text{—}N^+(CH_3)_3OH(s).$$

(3) Transform the hydroxyl group bonded onto the alkaline anion resin into Cl⁻ (chloride ion) with 5% by mass sodium chloride solution:

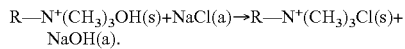
$$R\text{—}N^+(CH_3)_3OH(s)+NaCl(a)\rightarrow R\text{—}N^+(CH_3)_3Cl(s)+NaOH(a).$$

Compared with the related art, beneficial effects of the disclosure are as follows:

1. The method takes an alkaline anion resin as a base, uses a potassium ferrate as an iron source, and a characteristic of ferrate ions easily adsorbed on a surface of a anion resin are utilized to prepare resin-based iron oxide-containing composite phosphate removal adsorbent by one-step in-situ hydrolysis precipitation, compared with the related art, a preparation process of the disclosure is relatively simpler, a time period is shorter, and a production cost is lower.

2. When the resin-based iron oxide-containing composite phosphate removal adsorbent of the disclosure is used for a pollution treatment of phosphate-containing waste effluents, it has a strong ability to remove other anions in the waste effluents. It has a strong adsorption capacity, fast adsorption speed, and large adsorption capacity for the phosphate, and also has advantages of strong regeneration ability, multiple repeated use times, etc.

BRIEF DESCRIPTION OF THE DRAWINGS

FIG. 1 is a three-dimensional schematic diagram of an ecological ditch of a seventh embodiment.

In the FIG. 1, 1—water plant Zizania, 2—gravel, 3—first water intake point, 4—100 mesh nylon net bag wrapped with the resin-based iron oxide-containing composite phosphate removal adsorbent, 5—fixed iron frame, 6—second water intake point, and 7—overflow weir.

DETAILED DESCRIPTION OF EMBODIMENTS

The disclosure is further illustrated by specific embodiments below.

First Embodiment

A potassium ferrate of 7.14 g was dissolved in a water of 400 ml with pH=10 to prepare an alkaline potassium ferrate solution with concentration of 0.09 mol/L, an IRA-402 resin of 20 g was immediately added into the alkaline potassium ferrate solution, and magnetically stirred for 2 h to make ferrate ions exchange with anions of the IRA-402 resin, and then, a supernatant was discarded and a water of 200 ml was added, and stirred at 50° C. for 1 hour to make the ferrate ions exchanged onto the resin hydrolyze into a ferric hydroxide, after that, a hydroxyl group bonded onto the resin was transformed into Cl⁻ with 5% by mass sodium chloride solution to thereby obtain a composite resin loaded with nano-sized hydrated iron oxides, and finally the composite resin loaded with nano-scale hydrated iron oxides was washed to be neutrality, and dried or air dried in a cool place to obtain a resin-based iron oxide-containing composite phosphate removal adsorbent with a solid loading of Fe(III) being 25.7 mg/g.

Second Embodiment

A potassium ferrate of 13.85 g was dissolved in a water of 1000 ml with pH=12 to prepare an alkaline potassium ferrate solution with concentration of 0.07 mol/L, an IRA-900 resin of 100 g was immediately added into the alkaline potassium ferrate solution, and mechanical stirred for 2 h to make ferrate ions exchange with anions of the IRA-900 resin. And then, a supernatant was discarded and a water of 500 ml was added, and stirred at 70° C. for 1 hour to make the ferrate ions exchanged onto the resin hydrolyze into a ferric hydroxide, after that, a hydroxyl group bonded onto the resin was transformed into Cl⁻ with 2% by mass sodium chloride solution to thereby obtain a composite resin loaded with nano-sized hydrated iron oxides, and finally the composite resin loaded with nano-scale hydrated iron oxides was washed to be neutrality, and dried or air dried in a cool place to obtain a resin-based iron oxide-containing composite phosphate removal adsorbent with a solid loading of Fe(III) being 24.5 mg/g.

Third Embodiment

A potassium ferrate of 5.94 g was dissolved in a water of 200 ml with pH=9 to prepare an alkaline potassium ferrate solution with concentration of 0.15 mol/L, a D-201 resin of 40 g was immediately added into the alkaline potassium ferrate solution, and magnetically stirred for 3 h to make ferrate ions exchange with anions of the D-201 resin, and then, a supernatant was discarded and a water of 100 ml was added, and stirred at 60° C. for 2 hour to make the ferrate ions exchanged onto the resin hydrolyze into a ferric hydroxide, after that, a hydroxyl group bonded onto the resin was transformed into Cl⁻ with 8% by mass sodium chloride solution to thereby obtain a composite resin loaded with nano-sized hydrated iron oxides, and finally the composite resin loaded with nano-scale hydrated iron oxides was washed to be neutrality, and dried or air dried in a cool place to obtain a resin-based iron oxide-containing composite phosphate removal adsorbent with a solid loading of Fe(III) being 39.2 mg/g.

Fourth Embodiment

The resin-based iron oxide-containing composite phosphate removal adsorbent (0.5 g/L) prepared in first embodiment, the resin-based iron oxide-containing composite phosphate removal adsorbent (0.5 g/L) prepared in second embodiment and the resin-based iron oxide-containing composite phosphate removal adsorbent (0.5 g/L) prepared in third embodiment were respectively added into phosphate solutions (0.1 mM P—$PO_4^{3-}$) of 100 mL with different sulfate concentrations (0-15 mM) for adsorption experiments. Solutions of the adsorption experiments have an initial pH of 7 (no adjustment in the adsorption process), constant temperature vibration adsorption for 24 hours, detection of remaining phosphate contents in suspensions, calculation of phosphate removal rates, and comparison with original resins, results are shown in Table 1.

Table 1 shows the phosphate removal rates (%) measured at different sulfate radical concentrations

| $SO_4^{2-}$(mM) | 0 | 0.15 | 0.3 | 0.6 | 1 | 3 | 5 | 10 | 15 |
|---|---|---|---|---|---|---|---|---|---|
| First embodiment | 99 | 99 | 97 | 69 | 42 | 30 | 28 | 26 | 25 |
| Second embodiment | 93 | 90 | 78 | 54 | 32 | 21 | 19 | 18 | 18 |
| Third Embodiment | 96 | 92 | 84 | 44 | 26 | 24 | 22 | 19 | 17 |
| IRA-402 | 90 | 76 | 69 | 19 | 6 | 5 | 1 | 0 | 0 |
| IRA-900 | 85 | 68 | 30 | 15 | 2 | 0 | 0 | 0 | 0 |
| D-201 | 88 | 73 | 42 | 24 | 10 | 4 | 0 | 0 | 0 |

It can be seen from the above results that as the sulfate concentration increases, the phosphate removal rate of the resin decreases, but the phosphate removal rate of the resin-based iron oxide-containing composite phosphate removal adsorbent is significantly higher than that of the untreated resin. Especially in first embodiment, until the sulfate radical concentration reached 0.3 mM, the phosphate removal rate did not significantly decrease, so the adsorption selectivity to phosphate is the highest and the anti-interference ability is the strongest.

Fifth Embodiment

The resin-based iron oxide-containing composite phosphate removal adsorbent prepared in first embodiment, the resin-based iron oxide-containing composite phosphate removal adsorbent prepared in second embodiment and the resin-based iron oxide-containing composite phosphate removal adsorbent prepared in third embodiment were respectively added into solutions with an initial pH of 7 and a phosphate concentration of 10 mg/L, an amount of adding the resin-based iron oxide-containing composite phosphate removal adsorbent is 0.5 g/L, and then samples are taken at different time points of 10, 20, 30, 45, 60, 80, 100, 120 min to detect remaining phosphate contents in suspensions, calculation of phosphate removal rates, and comparison with original resins, results are shown in Table 2.

Table 2 shows the phosphate removal rates (%) measured at different time points

| Time(min) | 10 | 20 | 30 | 45 | 60 | 80 | 100 | 120 |
|---|---|---|---|---|---|---|---|---|
| First embodiment | 10 | 19 | 26 | 39 | 45 | 54 | 62 | 69 |
| Second embodiment | 9 | 21 | 30 | 39 | 51 | 64 | 69 | 73 |
| Third embodiment | 11 | 24 | 29 | 41 | 52 | 63 | 67 | 72 |
| IRA-402 | 5 | 13 | 22 | 31 | 38 | 47 | 52 | 56 |
| IRA-900 | 5 | 14 | 20 | 25 | 33 | 41 | 45 | 52 |
| D-201 | 7 | 11 | 18 | 26 | 33 | 42 | 46 | 54 |

It can be seen from the above result that as time goes on, the phosphate removal rates of the resin increases correspondingly, but the phosphate removal rates of the resin-based iron oxide-containing composite phosphate removal adsorbents are significantly higher than that of the untreated resins. Therefore, an adsorption capacity of the resin-based iron oxide-containing composite phosphate removal adsorbent of the disclosure is stronger and faster.

Sixth Embodiment

The resin-based iron oxide-containing composite phosphate removal adsorbent of 5 mL prepared in first embodiment, the resin-based iron oxide-containing composite phosphate removal adsorbent of 5 mL prepared in second embodiment, and the resin-based iron oxide-containing composite phosphate removal adsorbent of 5 mL prepared in third embodiment were respectively added into plexiglass adsorption columns with an inner diameter of 12 mm and a length of 25 mm, and then a phosphate-containing waste effluents (P=2 mg/L, and $SO_4^{2-}$=120 mg/L, $Cl^-$=$HCO_3^-$=100 mg/L, $NO_3^-$=40 mg/L, pH=7) flowed through the adsorption column from top to bottom for elution at a temperature of 30° C. and a flow rate of 15 BV/h (Bed Volume per hour), treatment volumes of effluent P concentrations controlled below 0.5 mg/L in the three embodiments are shown in Table 3. After the adsorption is broken through (also referred to the elution is completed), use 50 mL of a mixed solution of 4% mass percentage NaCl and 4% mass percentage NaOH to pass through the adsorption column at a temperature of 20° C. and a flow rate of 10 mL/h to regenerate (also referred to as restore) the alkaline anion resin. Restoring rates are shown in Table 3, and restored alkaline anion resins were rinsed with water to be neutral can continue to be used.

TABLE 3

| | Waste effluents treatment volume | Resin restoring rate |
|---|---|---|
| First embodiment | 630BV | 98% |
| Second embodiment | 650BV | 98% |
| Third embodiment | 550BV | 97% |
| IRA-402 | 350BV | 99% |
| IRA-900 | 360BV | 99% |
| D-201 | 310BV | 99% |

It can be seen from the above results that the amount of phosphate-containing waste effluents treated by the resin-based iron oxide-containing composite phosphate removal adsorbent is much higher than that of the untreated resin, and the resin-based iron oxide-containing composite phosphate removal adsorbent has strong restoring ability.

Seventh Embodiment

The resin-based iron oxide-containing composite phosphate removal adsorbent prepared in first embodiment was added to a hard ecological ditch, and a specific structure is shown in FIG. 1. After processing farmland runoff from about 6 acres of paddy fields, in the 54 days of continuous monitoring, a second water intake point 6 compared with a first water intake point 3, an average reduction of $PO_3^{4-}$ in farmland runoff is 34.4%.

The above is detailed description of the disclosure in combination with specific preferred embodiments, and it cannot be assumed that the specific implementations of the disclosure are limited to these descriptions. For the person of ordinary skill in the technical field to which the disclosure belongs, without deviating from the concept of the disclosure, several simple deductions or replacements can be made, which should be regarded as falling within the protection scope of the disclosure.

What is claimed is:

1. A preparation method of a resin-based iron oxide-containing composite phosphate removal adsorbent, comprising:

step (i) adding an alkaline anion resin into a prepared alkaline potassium ferrate solution, and stirring for 1-5 hours at room temperature to make ferrate ions exchange with anions of the alkaline anion resin;

step (ii) discarding a supernatant in the solution obtained in step (i), adding water, heating to 50° C.-70° C. and stirring again for 1-3 hours to make the ferrate ions exchanged onto the alkaline anion resin hydrolyze into a ferric hydroxide;

step (iii) adding a 2-10% by mass sodium chloride solution to the solution obtained in step (ii) to transform a hydroxyl group bonded onto the alkaline anion resin into $Cl^-$ to thereby obtain a composite resin loaded with nano-sized hydrated iron oxides; and step (iv) washing the composite resin loaded with nano-sized hydrated iron oxides to be neutral and then drying to obtain the resin-based iron oxide-containing composite phosphate removal adsorbent;

wherein the potassium ferrate solution of step (i) has a concentration of 0.03-0.2 mol/L, and a pH of 9-12;

wherein the concentration of the added alkaline anion resin is 20-200 g/L.

2. A method of treating phosphate-containing waste effluents, comprising the following steps:

packing the resin-based iron oxide-containing composite phosphate removal adsorbent obtained by the preparation method as claimed in claim 1 into a column, and introducing phosphate-containing waste effluents into the column for elution at a temperature of 20-40° C. and a flow rate of 10-30BV/h; and adding a mixed solution of 2-5% NaCl and 2-5% NaOH for restoring the alkaline anion resin, after the elution is completed.

* * * * *